United States Patent [19]

Kuroda et al.

[11] 4,064,334

[45] Dec. 20, 1977

[54] PROCESS FOR PREPARING POLYOLEFINS

[75] Inventors: Nobuyuki Kuroda; Toru Nakamura, both of Yokohama; Takeichi Shiraishi; Kazuo Matsuura, both of Kawasaki; Mituji Miyoshi, Kanagawa, all of Japan

[73] Assignee: Nippon Oil Company Ltd., Tokyo, Japan

[21] Appl. No.: 705,606

[22] Filed: July 15, 1976

[30] Foreign Application Priority Data

Aug. 5, 1975  Japan .................... 50-94721

[51] Int. Cl.$^2$ .................... C08F 4/02; C08F 10/02
[52] U.S. Cl. .................... 526/119; 252/429 C; 526/125; 526/153; 526/352; 526/906
[58] Field of Search ............ 526/119, 124, 125, 153

[56] References Cited

U.S. PATENT DOCUMENTS

| 3,357,967 | 12/1967 | Wesslau .................... 526/119 |
| 3,491,073 | 1/1970 | Marinak .................... 526/119 |
| 3,769,373 | 10/1973 | Reed et al. .................... 526/153 |
| 3,991,260 | 11/1976 | Matsuura et al. .................... 526/125 |

OTHER PUBLICATIONS

Zeiss, Organometallic Chemistry, Reinhold Pub. Corp., (1960), pp. 203-204.

Primary Examiner—Edward J. Smith

[57] ABSTRACT

According to the present invention, there is provided a process for preparing polyolefins by polymerizing or copolymerizing olefins in the presence of a catalyst consisting of a solid component and an organometallic compound component, characterized in that said solid component is obtained by copulverizing 1. a magnesium halide,
2. a compound represented by the general formula $Al(OR)mX_{3-m}$ wherein R is alkyl and/or aralkyl having 1 to 20 carbon atoms and may be the same or different, X is halogen and $0 < m \leq 3$,
3. a tetravalent titanium compound, and
4. a trivalent titanium compound and in that said organometallic compound component is a mixture of
5. a trialkylaluminum and
6. a compound represented by the general formula $AlR'nX_{3-n}$ wherein R' is alkyl having 1 to 10 carbon atoms and may be the same or different, X is halogen and $0 < n < 3$.

10 Claims, No Drawings

PROCESS FOR PREPARING POLYOLEFINS

BACKGROUND OF THE INVENTION

1. Field of the Invention

This invention relates to a process for preparing polyolefins by use of a novel polymerization catalyst. More particularly, it is concerned with a process for preparing polyolefins by polymerizing or copolymerizing olefins in the presence of a catalyst, said catalyst comprising a combination of a solid component which is obtained by copulverizing (1) a magnesium halide, (2) a compound represented by the general formula Al(OR)mX$_{3-m}$ wherein R is alkyl and/or aralkyl having 1 to 20 carbon atoms and may be the same or different, X is halogen and $0 < m \leq 3$, (3) a tetravalent titanium compound and (4) a trivalent titanium compound, and a mixture which consists of (5) a trialkylaluminum and (6) an organoaluminum compound of the general formula AlR'$n$X$_{3-n}$ wherein R' is alkyl having 1 to 10 carbon atoms and may be the same or different, X is halogen and $0 < n < 3$, whereby the yield of polymer per solid and that per transition metal are remarkably increased resulting in the process dispensing with the step of removing residual catalyst in the polymer and at the same time the bulk density of the resulting polymer is hightened, the molecular weight distribution thereof is widened and consequently the fluidity of the polymer in a molten state is improved.

2. Description of the Prior Art

Heretofore, in the technical field of this sort, applicant of the present invention has found that if olefin polymerization is made by use of a catalyst which comprises a combination of a solid component obtained by copulverizing a magnesium halide, aluminum alkoxide and a tetravalent titanium compound, and an organoaluminum compound and/or an organozinc compound, the catalyst activity is remarkably increased and the resulting polymer has a high bulk density and an extremely improved impact strength (see Japanese patent public disclosure No. 64381/75). Also, applicant of the present invention has filed a patent application on his finding that a similar effect is obtained even by a combination of a solid component obtained by copulverizing a magnesium halide, an aluminum alkoxide and a trivalent titanium compound and/or vanadium compound, and an organoaluminum compound and/or an organozinc compound. However, all these prior inventions are disadvantageous in that the molecular weight distribution of the resulting polymer is narrow resulting in the fluidity of the polymer in a molten state being poor, although the polymer has a high impact strength.

SUMMARY OF THE INVENTION

As a result of a keen study we have made to improve the fluidity of a molten polyolefin resin, we found that a polyolefin having a superior fluidity, that is, having a large flow parameter, can be prepared with an extremely high catalyst activity by use of, as a solid component, a solid powder obtained by copulverizing (1) a magnesium halide, (2) a compound represented by the general formula Al(OR)mX$_{3-m}$ wherein R is alkyl and/or aralkyl having 1 to 20 carbon atoms, preferably 1 to 10 carbon atoms and may be the same or different, X is halogen and $0 < m \leq 3$, (3) a tetravalent titanium compound and (4) a trivalent titanium compound, and also by use of, as an organometallic compound component, a mixture of (5) a trialkylaluminum represented by the general formula AlR$_3$ wherein R is alkyl having 1 to 10 carbon atoms and may be same or different and (6) an organoaluminum compound represented by the general formula AlR'$n$X$_{3-n}$ wherein R' is alkyl having 1 to 10 carbon atoms and may be the same or different, X is halogen and $0 < n < 3$. Thus we have solved the aforementioned problems and completed the present invention.

In the present invention, the flow parameter is defined by the following equation:

$$\text{Flow parameter} = \log\left(\frac{\text{Melt index at a load of 21.6 kg}}{\text{Melt index at a load of 2.16 kg}}\right)$$

Accordingly, the present invention provides a novel catalyst system which affords with a high catalyst activity polyolefins having a large flow parameter and a high bulk density.

Even if there is used as a solid component a solid powder obtained by copulverizing (1) a magnesium halide, (2) a compound of the general formula Al(OR)mX$_{3-m}$, (3) a tetravalent titanium compound and (4) a trivalent titanium compound, if (5) trialkylaluminum alone is used as an organometallic compound component, it is impossible to obtain a satisfactory value of flow parameter and thus the object of the present invention is not attained. In the case where a compound of the general formula AlR'$n$X$_{3-n}$ alone is used as an organometallic compound component, the object of the present invention is not attained, either. Further, even if there is used as an organometallic compound component a mixture of a trialkylaluminum and a compound of the general formula AlR'X$_{3-n}$, if as a solid component there is used a solid powder obtained by copulverizing only a magnesium halide, a compound of the general formula Al(OR)mX$_{3-m}$ and a tetravalent titanium compound, it is impossible to obtain a satisfactory value of flow parameter and thus the object of the present invention is not achieved, either. Moreover, in the case where there is used as a solid component a solid powder obtained by copulverizing only a magnesium halide, a compound of the general formula Al(OR)mX$_{3-m}$ and a trivalent titanium compound, the object of the present invention is not accomplished. A polyolefin having a high bulk density and a satisfactory large flow parameter could be efficiently prepared only when there were used as a solid component a solid powder obtained by copulverizing (1) a magnesium halide, (2) a compound of the general formula Al(OR)mX$_{3-m}$, (3) a tetravalent titanium compound and (4) a trivalent titanium compound, and as an organometallic compound component a mixture of (5) a trialkylaluminum and (6) a compound of the general formula AlR'$n$X$_{3-n}$. This is uninferable from the prior art and cannot but be considered to be surprising fact. That is, it should be noted that only when the catalyst system comprising the six components as described in the present invention was used, the following three points, that is, a high catalyst activity, a high bulk density of the resulting polyolefin and a large flow parameter of the resulting polyolefin, all could be satisfied simultaneously.

DESCRIPTION OF THE INVENTION

Detailed features of the present invention are as mentioned below.

Magnesium halides employed in the present invention are substantially anhydrous magnesium dihalides, such as magnesium fluoride ($MgF_2$), magnesium chloride ($MgCl_2$), magnesium bromide ($MgBr_2$), and magnesium iodide ($MgI_2$), among which magnesium chloride is specially preferred.

Examples of the compounds of the general formula $Al(OR)_mX_{3-m}$ which may be employed in the present invention are $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(On-C_5H_{11})_3$, $Al(On-C_6H_{13})_3$, $Al(On-C_8H_{17})_3$, $Al(OC_6H_5)_3$, $Al(OCH_3)_2Cl$, $Al(OCH_3)_2Br$, $Al(OCH_3)_2F$, $Al(OCH_3)_2I$, $Al(OCH_3)Cl_2$, $Al(OC_2H_5)_2Cl$, $Al(OC_2H_5)_2Br$, $Al(OC_2H_5)_2F$, $Al(OC_2H_5)_2I$, $Al(OC_2H_5)Cl_2$, $Al(OC_2H_5)Br_2$, $Al(On-C_3H_7)_2Cl$, $Al(Oi-C_3H_7)_2Cl$, $Al(Oi-C_3H_7)_2Br$, $Al(Oi-C_3H_7)Cl_2$, $Al(On-C_4H_9)_2Cl$, $Al(On-C_4H_9)_2Br$, $Al(Oi-C_4H_9)_2Cl$, $Al(Oi-C_4H_9)_2Br$, $Al(Ot-C_4H_9)_2Cl$, $Al(Ot-C_4H_9)_2Br$, $Al(On-C_5H_{11})_2Cl$, and $Al(OC_6H_5)_2Cl$, among which $Al(OC_2H_5)_3$, and $Al(OC_2H_5)_2Cl$ are specially preferred.

As tetravalent titanium compounds employed in the present invention there are mentioned those titanium compounds which are used in known Ziegler catalysts. Preferable tetravalent titanium compounds are the compounds represented by the general formula $Ti(OR)_nX_{4-n}$ wherein R is an alkyl, allyl, aryl or aralkyl group having 1 to 20 carbon atoms, preferably 1 to 8 carbon atoms, X is halogen atom and n is a whole number of from 0 to 4. Examples of the tetravalent titanium compounds are $TiCl_4$, $TiBr_4$, $TiI_4$, $Ti(OCH_3)Cl_3$, $Ti(OCH_3)Br_3$, $Ti(OCH_3)_2Cl_2$, $Ti(OCH_3)_2Br_2$, $Ti(OCH_3)_3Cl$, $Ti(OCH_3)_4$, $Ti(OC_2H_5)Cl_3$, $Ti(OC_2H_5)Br_3$, $Ti(OC_2H_5)_2Cl_2$, $Ti(OC_2H_5)_2Br_2$, $Ti(OC_2H_5)_3Cl$, $Ti(OC_2H_5)_4$, $Ti(On-C_3H_7)Cl_3$, $Ti(On-C_3H_7)_2Cl_2$, $Ti(Oi-C_3H_7)Cl_3$, $Ti(Oi-C_3H_7)Br_3$, $Ti(Oi-C_3H_7)_2Cl_2$, $Ti(Oi-C_3H_7)_2Br_2$, $Ti(Oi-C_3H_7)_3Cl$, $Ti(Oi-C_3H_7)_4$, $Ti(On-C_4H_9)Cl_3$, $Ti(On-C_4H_9)_2Cl_2$, $Ti(On-C_4H_9)_3Cl$, $Ti(On-C_4H_9)_4$, $Ti(Oi-C_4H_9)Cl_3$, $Ti(Oi-C_4H_9)_2Cl_2$, $Ti(Oi-C_4H_9)_2Cl_2$, $Ti(Oi-C_4H_9)_3Cl$, $Ti(Oi-C_4H_9)_3Cl$, $Ti(Oi-C_4H_9)_4$, $Ti(Ot-C_4H_9)Cl_3$, $Ti(Ot-C_4H_9)_2Cl_2$, $Ti(Ot-C_4H_9)_2Cl_2$, $Ti(Ot-C_4H_9)_3Cl$, $Ti(Ot-C_4H_9)_4$, $Ti(On-C_5H_{11})Cl_3$, $Ti(On-C_6H_{13})Cl_3$, $Ti(OC_6H_5)Cl_3$, $Ti(OC_6H_5)_2Cl_2$, $Ti(OC_6H_5)_3Cl$, $Ti(OC_6H_5)_4$, $Ti(OCH_3)(OC_2H_5)Cl_2$, $Ti(OC_2H_5)(Oi-C_4H_9)Cl_2$, $Ti(OC_2H_5)(Oi-C_3H_7)Cl_2$, $Ti(OC_2H_5)(OC_6H_5)Cl_2$, $Ti(OCH_3)_2$, $Ti(OC_2H_5)_2$, $Ti(Oi-C_4H_9)_2$, reaction product of $SiCl_4$ and the compound $Ti(OR)_mX_{4-m}$ and mixtures thereof.

Trivalent titanium compounds employed in the present invention are not specially restricted. Among these may be mentioned titanium trihalides obtained by reducing titanium tetrahalides with hydrogen, aluminum, titanium or an organometallic compound such as organoaluminum compound. Preferable titanium trihalides are $TiCl_3$, $TiCl_3.\frac{1}{3}AlCl_3$, and $TiBr_3$. Trivalent titanium compounds except titanium trihalides may be obtained by reducing various tetravalent titanium alkoxyhalides represented by the general formula $Ti(OR)_nX_{4-n}$ wherein R is alkyl, allyl, aryl or aralkyl group having 1 to 20 carbon atoms, X is halogen atom and n is a whole number of from 1 to 4, with an organometallic compound of a metal of the groups I to III of the periodic table, at a temperature of from $-80°$ C to $200°$ C, preferably $0°$ C to $100°$ C and a molar ratio of titanium alkoxyhalide to organometallic compound being in the range of from 1 : 5 to 5 : 1, preferably 1 : 2 to 2 : 1.

As trialkylaluminum used in the present invention there are mentioned $Al(CH_3)_3$, $Al(C_2H_5)_3$, $Al(n-C_3H_7)_3$, $Al(i-C_3H_7)_3$, $Al(n-C_4H_9)_3$, $Al(i-C_4H_9)_3$, $Al(t-C_4H_9)_3$, $Al(n-C_5H_{11})_3$, $Al(n-C_6H_{13})_3$, $Al(n-C_8H_{17})_3$, $Al(n-C_{10}H_{21})_3$, and mixtures thereof.

By way of illustrating the compounds of the general formula $AlR'_nX_{3-n}$ which may be employed in the present invention, mention may be made of the following: $Al(CH_3)_2Cl$, $Al(CH_3)_2Br$, $Al(C_2H_5)_2Cl$, $Al(C_2H_5)_2Br$, $Al(C_2H_5)_2F$, $Al(C_2H_5)_2I$, $Al(C_2H_5)Cl_2$, $Al(n-C_3H_7)_2Cl$, $Al(i-C_3H_7)_2Cl$, $Al(i-C_3H_7)_2Br$, $Al(n-C_4H_9)_2Cl$, $Al(i-C_4H_9)_2Cl$, $Al(t-C_4H_9)_2Cl$, $Al(n-C_5H_{11})_2Cl$, $Al(n-C_6H_{13})_2Cl$, $Al(n-C_8H_{17})_2Cl$, $Al(n-C_{10}H_{21})_2Cl$, $Al(C_2H_5)_{1.5}Cl_{1.5}$, and mixture thereof.

In the present invention, in copulverizing (1) a magnesium halide, (2) a compound of the general formula $Al(OR)_mX_{3-m}$, (3) a tetravalent titanium compound and (4) a trivalent titanium compound, the order of adding these components is not specially restricted. That is, the copulverization may be performed in a simultaneous presence of all these components; or by copulverizing a magnesium halide and a compound of the general formula $Al(OR)_mX_{3-m}$ and subsequently adding a trivalent and a tetravalent titanium compounds followed by application of a further copulverization; or by copulverizing a magnesium halide and a trivalent and a tetravalent titanium compounds and subsequently adding a compound of the general formula $Al(OR)_mX_{3-m}$ followed by application of a further copulverization; or by copulverizing a compound of the general formula $Al(OR)_mX_{3-m}$ and a trivalent and a tetravalent titanium compounds, thereafter adding a magnesium halide and further applying a copulverization. It goes without saying that these operations should be done in an inert gas atmosphere and moisture should be avoided as far as possible.

Although the apparatus to be used for the copulverization is not specially restricted, usually employed are ball mill, vibration mill, rod mill and impact mill. Conditions such as pulverization temperature and pulverization time can readily be decided by those skilled in the art according to the method of pulverization. Generally adopted are pulverization temperatures in the range of from $0°$ to $200°$ C and preferably from $20°$ to $100°$ C, and pulverization time in the range of from 0.5 to 50 hours and preferably from 1 to 30 hours.

In the present invention, a magnesium halide and a compound of the general formula $Al(OR)_mX_{3-m}$ are used in such a mixing ratio as Mg:Al molar ratio is in the range of from 1:0.01 to 1:1 and preferably from 1:0.05 to 1:0.5.

The amount of a tetravalent and a trivalent titanium compounds to be supported is preferably adjusted so that the amount of titanium contained in the resulting solid is in the range of from 0.5 to 20% by weight, and the range of from 1 to 8% by weight is specially desirable in order to obtain a well-balanced activity per titanium and per solid. The mixing ratio of a tetravalent titanium compound and a trivalent titanium compound is not specially restricted, it usually being such that the molar ratio of tetravalent titanium compound to trivalent titanium compound is in the range of from 1:50 to 50:1.

The mixing ratio of a trialkylaluminum and a compound of the general formula $AlR'_nX_{3-n}$ which are used as an organometallic compound component in the present invention, is usually such that the molar ratio of trialkylaluminum to $AlR'_nX_{3-n}$ is in the range of from 1:1000 to 1:2 and preferably from 1:200 to 1:3.

The amount of the organometallic compound component used in the present invention is not specially restricted. Usually it may be used in the range of from 0.1 to 1,000 moles per mole of titanium compound.

Olefin polymerization reaction using the catalyst of the present invention is conducted in the same way as in olefin polymerization reactions using conventional Ziegler catalysts. That is, a substantially oxygen- and moisture-free condition is maintained throughout the reaction. Olefin polymerization conditions involve temperatures in the range of from 20° to 120° C and preferably from 50° to 100° C, and pressures from atmospheric to 70 kg/cm$^2$.G and preferably from 2 to 60 kg/cm$^2$.G. Molecular weight can be adjusted to a certain extent by changing polymerization conditions such as the polymerization temperature and the molar ratio of catalyst, but the adjustment can be made more effectively by adding hydrogen into the polymerization system. With the catalyst of the present invention, a two- or more-stage polymerization reaction having different polymerization conditions such as different hydrogen concentrations and different polymerization temperatures can of course be made without any trouble.

The process of the present invention can be applied to the polymerization of all olefins that are polymerizable with Ziegler catalysts. For example, it is suitably applied to the homopolymerization of α-olefins such as ethylene, propylene, and 1-butene, and to the copolymerization of ethylene and propylene, ethylene and 1-butene, and propylene and 1-butene. Further, copolymerization with dienes aiming at modification of polyolefin, for example, copolymerization of ethylene and butadiene and that of ethylene and 1,4-hexadiene, is also preferably conducted.

DESCRIPTION OF PREFERRED EMBODIMENTS

The following examples are further illustrative of the present invention. It is to be understood, however, that the invention is not limited thereto.

EXAMPLE 1 a. Preparation of Catalyst

In a stainless steel pot with a content volume of 400 ml containing 25 stainless steel balls each ½ inch in diameter were placed 10 g of magnesium chloride (a commercially available anhydrous magnesium chloride which has been treated in HCl gas stream at 350° C for 20 hours), 4.4 g of aluminum triethoxide, 3.4 g of titanium tetrachloride and 0.5 g of aluminum-reduced titanium trichloride (TiCl$_3$ . ⅓ AlCl$_3$), and a ball milling was applied for 16 hours at room temperature under a nitrogen atmosphere. The resulting solid powder contained 53 mg of titanium per g of the solid.

b. Polymerization

A 2 liter stainless steel autoclave equipped with an induction stirrer was purged with nitrogen, in which were then placed 1,000 ml of hexane, 4.9 millimole of diethylaluminum monochloride, 0.1 millimole of triethylaluminum and 15 mg of the solid powder prepared above, and the temperature was raised to 90° C with stirring. The system, which was at a pressure of 2 kg/cm$^2$.G. due to the vapor pressure of hexane, was pressurized with hydrogen to a total pressure of 6 kg/cm$^2$.G and then with ethylene to a total pressure of 10 kg/cm$^2$.G while polymerization was started. The polymerization was continued for 1 hour while ethylene was continuously introduced to maintain the total pressure at 10 kg/cm$^2$.G. The polymer slurry was then transferred into a beaker and hexane removed under reduced pressure to give 150 g of polyethylene having a melt index of 0.30 and a bulk density of 0.31. Catalyst activity was 47,170 g polyethylene/g. Ti.hr.C$_2$H$_4$ pressure, 2,500 g polyethylene/g solid.hr.C$_2$H$_4$ pressure. The polyethylene, which had a flow parameter of 1.85, exhibited a good fluidity when melted.

COMPARATIVE EXAMPLE 1

In the autoclave used in Example 1 were placed 1,000 ml of hexane, 15 mg of the solid powder prepared in Example 1, and 2 millimole of triethylaluminum, and the temperature was raised to 90° C with stirring. The system was pressurized with hydrogen to a total pressure of 4 kg/cm$^2$.G and then with ethylene to a total pressure of 10 kg/cm$^2$.G while polymerization was conducted for 1 hour in the same way as in Example 1 to give 203 g of a white polyethylene having a melt index of 0.41 and a bulk density of 0.26. Catalyst activity was 42,600 g polyethylene/g Ti.hr.C$_2$H$_4$ pressure, 2,260 g polyethylene/g solid.hr.C$_2$H$_4$ pressure. The polyethylene had a flow parameter of 1.51 and its melt fluidity was inferior as compared with Example 1.

COMPARATIVE EXAMPLE 2

In the autoclave used in Example 1 were placed 1,000 ml of hexane, 15 mg of the solid powder prepared in Example 1, and 2 millimole of diethylaluminum monochloride, and the temperature was raised to 90° C with stirring. The system was pressurized with hydrogen to a total pressure of 7.6 kg/cm$^2$.G and then with ethylene to a total pressure of 10 kg/cm$^2$.G while polymerization was made for 1 hour in the same way as in Example 1 to give 49 g of a white polyethylene having a melt index of 0.55 and a bulk density of 0.23. Catalyst activity was 25,470 g polyethylene/g. Ti.hr.C$_2$H$_4$ pressure, 1,350 g polyethylene/g solid.hr.C$_2$H$_4$ pressure. The polyethylene had a flow parameter of 1.68 and its melt fluidity was inferior as compared with Example 1.

COMPARATIVE EXAMPLE 3

In the ball mill pot used in Example 1 were placed 10 g of the magnesium chloride also used in Example 1, 4.4 g of aluminum triethoxide and 3.4 g of titanium tetrachloride, and a ball milling was applied for 16 hours at room temperature under a nitrogen atmosphere. The resulting solid powder contained 48 mg of titanium per g of the solid.

In the autocalve described in Example 1 were placed 1,000 ml of hexane, 4.9 millimole of diethylaluminum monochloride, 0.1 millimole of triethylaluminum and 15 mg of the solid powder prepared above, and the temperature was raised to 90° C with stirring. The system was pressurized with hydrogen to a total pressure of 4 kg/cm$^2$.G and then with ethylene to a total pressure of 10 kg/cm$^2$.G while polymerization was conducted for 1 hour in the same way as in Example 1 to give 221 g of a white polyethylene having a melt index of 0.21 and a bulk density of 0.27. Catalyst activity was 50,210 g polyethylene/g solid.hr.C$_2$H$_4$ pressure, 2,410 g polyethylene/g solid.hr.C$_2$H$_4$ pressure. The polyethylene had a flow parameter of 1.54 and its melt fluidity was inferior as compared with Example 1.

COMPARATIVE EXAMPLE 4

In the ball mill pot described in Example 1 were placed 10 g of the magnesium chloride used in Example 1, 4.4 g of aluminum triethoxide and 3.6 g of titanium trichloride, and a ball milling was applied for 16 hours at room temperature under a nitrogen atmosphere. The resulting solid powder contained 46 mg of titanium per g of the solid.

In the autoclave described in Example 1 were placed 1,000 ml of hexane, 4.9 millimole of diethylaluminum monochloride, 0.1 millimole of triethylaluminum and 15 mg of the solid powder prepared above, and the temperature was raised to 90° C with stirring. The system was pressurized with hydrogen to a total pressure of 7.6 kg/cm$^2$ and then with ethylene to a total pressure of 10 kg/cm$^2$ while polymerization was conducted in the same way as in Example 1 to give 67 g of a white polyethylene having a melt index of 0.15 and a bulk density of 0.28. Catalyst activity was 40,220 g polyethylene/g Ti.hr.C$_2$H$_4$ pressure, 1,850 g polyethylene/g solid.hr.C$_2$H$_4$ pressure. The polyethylene had a flow parameter of 1.62 and its melt fluidity was inferior as compared with Example 1.

COMPARATIVE EXAMPLE 5

In the ball mill pot described in Example 1 were placed 10 g of magnesium chloride, 3.4 g of titanium tetrachloride and 0.5 g of titanium trichloride, and a ball milling was applied for 16 hours at room temperature under a nitrogen atmosphere. The resulting solid contained 71 mg of titanium per g of the solid.

In the autoclave described in Example 1 were placed 1,000 ml of hexane, 4.9 millimole of diethylaluminum monochloride, 0.1 millimole of triethylaluminum and 15 mg of the solid powder prepared above, and the temperature was raised to 90° C with stirring. The system was pressurized with hydrogen to a total pressure of 6 kg/cm$^2$.G and then with ethylene to a total pressure of 10 kg/cm$^2$ while polymerization was made for 1 hour in the same procedure as in Example 1 to yield 73 g of a white polyethylene having a melt index of 0.24 and a bulk density of 0.16. Catalyst activity was 17,040 g polyethylene/g Ti.hr.C$_2$H$_4$ pressure, 1,210 g polyethylene/g solid.hr.C$_2$H$_4$ pressure. The polyethylene had a flow parameter of 1.79 and its melt fluidity was good, but the low bulk density of the polyethylene particles was a drawback.

EXAMPLE 2

In the ball mill pot described in Example 1 were placed 10 g of the magnesium chloride used in Example 1, 4.6 g of aluminum triisopropoxide, 3.4 g of titanium tetrachloride and 0.5 g of titanium trichloride, and a ball milling was applied for 16 hours at room temperature under a nitrogen atmosphere. The resulting solid powder contained 53 mg of titanium per g of the solid. Using 15 mg of this solid powder, 0.1 millimole of triethylaluminum and 4.9 millimole of diethylaluminum monochloride, polymerization was made for 1 hour in the same procedure as in Example 1 to yield 115 g of a white polyethylene having a melt index of 0.28 and a bulk density of 0.29. Catalyst activity was 36,000 g polyethylene/g Ti.hr.C$_2$H$_4$ pressure, 1,910 g polyethylene/g solid.hr.C$_2$H$_4$ pressure. The polyethylene had a flow parameter of 1.91 and its melt fluidity was good.

EXAMPLE 3

In the ball mill pot described in Example 1 were placed 10 g of the magnesium chloride used in Example 1, 2.2 g aluminum tri-sec-butoxide, 0.5 g titanium tetrachloride and 2.5 g of titanium trichloride, and a ball milling was applied for 16 hours at room temperature under a nitrogen atmosphere. The resulting solid powder contained 48 mg of titanium per g of the solid. Using 15 mg of this solid powder, 0.1 millimole of triethylaluminum and 4.9 millimole of diethylaluminum monochloride, polymerization was made for 1 hour in the same procedure as in Example 1 to yield 137 g of a white polyethylene having a melt index of 0.31 and a bulk density of 0.26. Catalyst activity was 47,500 g polyethylene/g Ti.hr.C$_2$H$_4$ pressure, 2,280 g polyethylene/g solid.hr.C$_2$H$_4$ pressure. The polyethylene had a flow parameter of 1.82 and its melt fluidity was good.

EXAMPLE 4

In the ball mill pot described in Example 1 were placed 10 g of the magnesium chloride used in Example 1, 4.1 g of aluminum diethoxy monochloride, 3.4 g of titanium tetrachloride and 1.0 g of titanium trichloride, and a ball milling was applied for 16 hours at room temperature under a nitrogen atmosphere. The resulting solid powder contained 60 mg of titanium per g of the solid. Using 15 mg of this solid powder, 0.1 millimole of triethylaluminum and 4.9 millimole of diethylaluminum monochloride, polymerization was made for 1 hour in the same procedure as in Example 1 to yield 201 g of a white polyethylene having a melt index of 0.45 and a bulk density of 0.29. Catalyst activity was 55,830 g polyethylene/g Ti.hr.C$_2$H$_4$ pressure, 3,350 g polyethylene/g solid.hr.C$_2$H$_4$ pressure. The polyethylene had a flow parameter of 1.79 and its melt fluidity was good.

EXAMPLE 5

In the ball mill pot described in Example 1 were placed 10 g of the magnesium chloride used in Example 1, 4.4 g of aluminum triethoxide, 3.0 g of titanium diisopropoxy dichloride and 1.0 g of titanium trichloride, and a ball milling was applied for 16 hours at room temperature under a nitrogen atmosphere. The resulting solid powder contained 46 mg of titanium per g of the solid. Using 15 mg of this solid powder, 0.1 millimole of triethylaluminum and 4.9 millimole of diethylaluminum monochloride, polymerization was made for 1 hour in the same procedure as in Example 1 to yield 164 g of a white polyethylene having a melt index of 0.33 and a bulk density of 0.27. Catalyst activity was 59,350 g polyethylene/g Ti.hr.C$_2$H$_4$ pressure, 2,730 g polyethylene/g solid.hr.C$_2$H$_4$ pressure. The polyethylene had a flow parameter of 1.83 and its melt fluidity was good.

EXAMPLE 6

In the autoclave used in Example 1 were placed 1,000 ml of hexane, 15 mg of the solid powder prepared in Example 1, 4.9 millimole of diethylaluminum monochloride and 0.1 millimole of triethylaluminum, and the temperature was raised to 90° C with stirring. The system was pressurized with hydrogen to a total pressure of 6 kg/cm$^2$.G and then with a mixed ethylene-propylene gas containing 2 mole % of propylene to a total pressure of 10 kg/cm$^2$.G while polymerization was made for 1 hour in the same procedure as in Example 1 to yield 140 g of a white polymer containing 7.3 methyl groups per 1,000 carbon atoms and having a melt index of 0.19 and a bulk density of 0.30. Catalyst activity was 43,900 g polymer/g Ti.hr.$C_2H_4$ pressure, 2,330 g polymer/g solid.hr.$C_2H_4$ pressure. The polymer had a flow parameter of 1.80 and its melt fluidity was good.

We claim:

1. A process for preparing polyolefins by polymerizing or copolymerizing olefins in the presence of a catalyst comprising a solid component and an organometallic compound component, characterized in that said solid component is obtained by copulverizing
   1. a magnesium dihalide
   2. a compound represented by the general formula $Al(OR)_m X_{3-m}$ wherein R is alkyl and/or aralkyl having 1 to 20 carbon atoms and may be the same or different, X is halogen and $0 < m \leq 3$,
   3. a tetravalent titanium compound, and
   4. a trivalent titanium compound being present in a molar ratio with tetravalent titanium compound (3) of from 50:1 to 1:50 and in that said organometallic compound component is a mixture of
   5. a trialkylaluminum and
   6. a compound represented by the general formula $AlR'_n X_{3-n}$ wherein R' is alkyl having 1 to 10 carbon atoms and may be the same or different, X is halogen and $0 < n \leq 3$, said compound being present in a molar ratio with trialkylaluminum(5) of from 2:1 to 1000:1.

2. A process according to claim 1 wherein the magnesium dihalide is substantially an anhydrous magnesium chloride.

3. A process according to claim 1 wherein the compound represented by the general formula $Al(OR)_m X_{3-m}$ is $Al(OC_2H_5)_3$ or $Al(OC_2H_5)_2Cl$.

4. A process according to claim 1 wherein the copulverization is made for 0.5 to 50 hours in an inert gas atmosphere at a temperature in the range of from 0° to 200° C.

5. A process according to claim 1 wherein the mixing ratio of a magnesium dihalide and a compound represented by the general formula $Al(OR)_m X_{3-m}$ is such that the molar ratio of Mg to Al is in the range of from 1:01 to 1:1.

6. A process according to claim 1 wherein the solid component contains 0.5 to 20 weight percent of titanium.

7. A process according to claim 1 wherein the mixing ratio of a trialkylaluminum and a compound represented by the general formula $AlR'_n X_{3-n}$ is such that the molar ratio of the former to the latter is in the range of from 1:200 to 1:3.

8. A process according to claim 1 wherein the organometallic compound component is used in an amount corresponding to 0.1 to 1000 moles per mole of a trivalent and a tetravalent titanium compounds.

9. A process according to claim 1 wherein the polymerization or copolymerization of olefins is conducted at a temperature in the range of from 20° to 120° C and at a pressure in the range of from atmospheric pressure to 70 kg/cm².G.

10. A process according to claim 1 wherein the polymerization or copolymerization of olefins is conducted with hydrogen added into the polymerization system.

* * * * *

UNITED STATES PATENT AND TRADEMARK OFFICE
CERTIFICATE OF CORRECTION

PATENT NO. : 4,064,334
DATED : December 20, 1977
INVENTOR(S) : Kuroda, et al.

It is certified that error appears in the above-identified patent and that said Letters Patent are hereby corrected as shown below:

Col. 3, line 40, "Ti(Oi-$C_4H_9$)$_2Cl_2$" should be deleted.

Col. 3, line 42, "Ti(Ot-$C_4H_9$)$_2Cl_2$" second occurrence should be deleted.

Col. 3, line 47, after "Ti(OCH$_3$)$_2$" insert -- (OC$_2$H$_5$)$_2$ --

Signed and Sealed this

Eighteenth Day of April 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,064,334
DATED : December 20, 1977
INVENTOR(S) : Kuroda, et al.

It is certified that error appears in the above—identified patent and that said Letters Patent are hereby corrected as shown below:

Column 9, Claim 1, line 27, "$0 < n \leqq 3$" should read as

-- $0 < n < 3$ --.

Signed and Sealed this

Seventeenth Day of July 1979

[SEAL]

Attest:

Attesting Officer

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,064,334
DATED : December 20, 1977
INVENTOR(S) : Nobuyuki Kuroda et al It is certified that error appears in the above-identified patent and that said Letters Patent are hereby corrected as shown below:

Column 10, Claim 5, line 11, "1:01" should read -- 1:0.01 --.

Signed and Sealed this

Second Day of October 1979

[SEAL]

Attest:

RUTH C. MASON
Attesting Officer

LUTRELLE F. PARKER
Acting Commissioner of Patents and Trademarks